United States Patent

[11] 3,607,736

| | | | |
|---|---|---|---|
| [72] | Inventor | Miyaji, Yusho |  |
| | | Kanagawa-ken, Japan | |
| [21] | Appl. No. | 809,109 | |
| [22] | Filed | Mar. 21, 1969 | |
| [45] | Patented | Sept. 21, 1971 | |
| [73] | Assignee | Kurita Water Industries Ltd. | |
| | | Osaka-shi, Japan | |
| [32] | Priority | Mar. 29, 1968 | |
| [33] | | Japan | |
| [31] | | 20070/1968 | |

[54] METHOD OF TREATING ORGANIC WASTE WATER
10 Claims, 2 Drawing Figs.

[52] U.S. Cl. ............................................. 210/11
[51] Int. Cl. ............................................. C02c 1/14
[50] Field of Search ................................... 210/2, 11, 16, 3-8

[56] References Cited
UNITED STATES PATENTS

| | | | | |
|---|---|---|---|---|
| 2,615,842 | 10/1952 | Kraus | | 210/8 |
| 2,788,127 | 4/1957 | Davidson | | 210/4 X |
| 3,168,465 | 2/1965 | Kraus et al. | | 210/16 X |
| 3,464,919 | 9/1969 | Barta et al. | | 210/11 |

OTHER REFERENCES

Ettinger, M. B., et al., Chemical and Hydraulic Characteristics of the Anaerobic Contact Process For Sewage Treatment, appearing in Biological Treatment of Sewage and Industrial Wastes, Vol. II, edited by McCabe, J. et al., 1958, pp. 145-, 155, Reinhold Publishing Co., N.Y. (copy in GP. 176)

*Primary Examiner*—Michael Rogers
*Attorney*—Woodhams, Blanchard and Flynn

ABSTRACT: A method of treating organic waste water which comprises the steps of bringing activated sludge consisting mainly of denitrifying bacteria into contact with organic waste water in the presence of nitrate ions or nitrite ions, keeping said waste water in an anaerobic state and destroying the decomposable organic matters contained in the waste water by virtue of the nitrate respiration of said denitrifying sludge.

PATENTED SEP 21 1971

3,607,736

INVENTOR
YUSHO MIYAJI

BY Woodhams, Blanchard & Flynn
ATTORNEYS

METHOD OF TREATING ORGANIC WASTE WATER

BACKGROUND OF THE INVENTION

1. Field of the Invention

The present invention relates to a method of treating organic waste water such as sewage, supernatant liquor effluent from a sludge digester, and waste water produced in factories, for reducing the B.O.D. thereof.

2. Description of the Prior Art

As a method of treating organic waste water, such as sewage, supernatant liquor effluent from night-soil digestion, and waste water produced in factories, the conventional 'activated sludge process' has been popular. This comprises aeration subsequent to mixing the waste water with activated sludge. In this method, however, it is necessary to introduce air for the sake of aeration, and accordingly, the regulation of the quantity of air introduced to maintain the treatment of the waste water in appropriate conditions constitutes one of the most important requisites therefor. Moreover, fluctuations of loads of waste water or changes in the kinds of organic matters contained in the waste water would produce an influence on microbes within the activated sludge and ordinarily cause to develop such a condition as so-called 'bulking.' As a result, the waste water treatment may become impossible and the quality of the post-treatment water may fluctuate. Thus it has been difficult to stabilize the conditions for treatment.

SUMMARY OF THE INVENTION

The present invention relates to a method intended for decomposing organic matters contained in the waste water by using an activated sludge comprising denitrifying bacteria of kinds which are absolutely different from those conventionally used in activated sludge, and causing said denitrifying bacteria to effect nitrate-respiration by utilizing nitrate or nitrite as a source of oxygen supply. In other words, the present invention relates to a method of treating organic waste water which is characterized by the fact that activated sludge comprising denitrifying bacteria as its main constituent is mixed with organic waste water in the presence of nitrate ions or nitrite ions and the resultant mixture is kept in an anaerobic state so as to decompose and eliminate organic matters contained in said organic waste water. In this context, the words 'in the presence of nitrate ions or nitrite ions' includes such cases where, for instance, nitrate or nitrite is mixed with the organic waste water, said organic waste water per se initially contains nitrate ions or nitrite ions, or the organic waste water is mixed with waste water containing nitrate or nitrite, in short, any state wherein nitrate ions or nitrite ions exist in the liquid mixture comprising the waste water and the denitrifying sludge.

With reference to the means for bringing organic waste water into contact with the denitrifying sludge according to the present invention, in addition to mixing both of them within a tank, there can also be used various other techniques such, for instance, first forming a denitrifying sludge layer within a cylindrical vessel and then causing organic waste water containing nitrate ions or nitrite ions to infiltrate into said denitrifying sludge layer from the bottom to the upper surface thereof. Denitrifying bacteria are so-called facultative anaerobic bacteria which solely utilize dissolved oxygen for respiration if there exists a sufficient quantity of dissolved oxygen available, whereas in case there is no dissolved oxygen available, they act to reduce nitrate or nitrite and utilize the resultant chemical oxygen, and thereby decompose organic matters through oxidation. Said denitrifying bacteria, which plentifully exist is soil, waste water, and activated sludge, are heterotrophic bacteria and are capable not only of decomposing organic compounds through oxidation into inorganic matters but also of synthesizing sludge and proliferating.

Denitrifying sludge to be employed in the present invention is acclimated by such a means, for instance, employing recycled sludge produced in the disposal plant as a result of the activated sludge process for treatment of supernatant liquor effluent from anaerobic digestion treatment of night-soil, sewage and other industrial waste waters or a strongly nitrogeneous soil and mixing therewith a solution containing organic matters and further adding thereto nitrate or nitrite and keeping said sludge in an anaerobic state. The kinds of bacteria contained in the thus acclimated denitrifying sludge include such denitrifying bacteria as Bacillus denitrificans, Bacterium denitrificans, Pseudomonas denitrificans, Pseudomonas stutzeri, Spirillum, and the like.

As for the nitrate to be employed, sodium nitrate, potassium nitrate, ammonium nitrate, and the like are suitable.

DESCRIPTION OF THE PREFERRED EMBODIMENT

Figure 1:
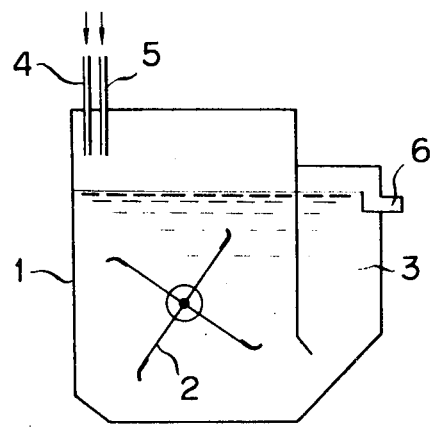
FIG. 1 shows a cross-sectional view of one embodiment of the present invention.

FIG. 1 shows an example of apparatus for treating waste water by mixing organic waste water with denitrifying sludge within a tank as a means of bringing them into contact with each other. In order to treat an organic waste water, the denitrifying sludge is preliminarily acclimated by means of said apparatus and the process of treating waste water follows thereto.

Activated sludge, such as that produced from sewage treatment or from night-soil treatment, and organic waste water are supplied to the reaction tank 1 and mixed therein. The mixed liquor suspended solid (M L S S) within said reaction tank on this occasion is M L be 1,000–4,000 p.p.m. and $B.O.D_5$ added thereto be several times of said M L S S. Furthermore, it is necessary to add to said mixture a nitrate or a nitrite, as a source of oxygen supply, to the extent that the quantity of said nitrate or nitrite added will be more than 0.5 kg. in terms of oxygen per 1 kg. of $B.O.D_5$ of said organic waste water. Subsequently, the thus processed mixture is subjected to stirring with the stirrer 2 and acclimated for about one week to thereby cause denitrifying bacteria to proliferate. The speed of said stirring is to be as slow as 2–5 r.p.m. so that it may suffice to prevent sludge from precipitating on the bottom of the reaction tank while augmenting the contact between said waste water and the denitrifying sludge. Intensive stirring is undesirable as it causes air to dissolve into said mixture to hamper the nitrate-respiration thereof.

Upon completing said acclimation of sludge, decomposition of organic matters contained in the organic waste water is effected by utilizing the nitrate respiration of denitrifying bacteria by continuously feeding the organic waste water through the raw feed pipe 4 and the solution of nitrate or nitrite through the chemical agents feed pipe 5, respectively, mixing same with the thus treated sludge maintaining the anaerobic state of the liquid mixture within the reaction tank through the same operation as in case of acclaiming denitrifying sludge. The liquid mixture within the reaction tank 1 is separated into sludge and supernatant liquid in the precipitation chamber 3, and said supernatant liquid is discharged through the drain pipe 6, while the precipitated sludge is returned to the reaction tank 1. It is noted, however, that in case said precipitation chamber 3 is installed separate from the reaction tank 1, it is necessary to provide a return pipe for sending the precipitated sludge back to the reaction tank 1.

The supply of waste water to the reaction tank is so regulated as to stabilize the B.O.D. loading in the range of 3–4 kg./m$^2$d, and the quantity of nitrate or nitrite to be employed is more than 0.5 kg. in terms of oxygen per 1 kg. of B.O.D. of the waste water to be treated. The reaction tank according to the present invention is so designed that denitrifying bacteria may decompose organic compounds into inorganic matters by utilizing oxygen from the nitrate or nitrite and, at the same time, nitrate nitrogen or nitrite nitrogen may be gasified and discharged outside the system as nitrogen gas.

As for the temperature and pH value of the liquid mixture within the reaction tank, it is desirable to keep the former in the range of 20–30° C. and the latter in the range of 7–9, but there is no necessity for regulating them particularly.

Inasmuch as the treating method according to the present invention does not require any air distribution whatever, there is no necessity for providing any blower or air-distribution pipe, and simple mixing of the nitrate or nitrite with the sludge and subsequent stirring will suffice. Drawbacks of conventional activated sludge process such as diffusion of bad-smelling gas owing to air distribution and the making of noise by the blower have been improved by the present invention. In addition, because the denitrifying sludge in the present invention is an anaerobic sludge, it does not give rise to 'bulking', and, moreover, it is capable of maintaining normal conditions suitable for treatment and accordingly no particular control operation is required. Also, as compared with the conventional activated sludge process, the B.O.D. loading per unit of capacity of the reaction tank can be augmented (in the conventional process it has been in the range of 1–2 kg. B.O.D./m²d), and it is possible to perform a high-rate treatment with a reaction tank of relatively small capacity.

Besides, when a waste water containing nitrate ions or nitrite ions is employed in lieu of adding nitrate or nitrite as described in the foregoing, it becomes possible to perform simultaneous treatment of organic waste water and waste water containing nitrate or nitrite. Furthermore, in certain plants where the waste water contains both the organic matters and the nitrate (or nitrite) ions, there may be cases where waste water treatment is feasible without employing any additional nitrate.

Next, as a method of treating organic waste water, the process of forming a denitrifying sludge layer preliminarily within a specific vessel and subsequently causing organic waste water containing nitrate ions or nitrite ions to infiltrate into said denitrifying sludge layer from the bottom toward the upper part thereof will be elucidated in the following.

The vessel to be employed in this embodiment of the method in the present invention desirably is a cylindrical tower-type vessel, but is not limited thereto.

According to this embodiment of the present invention, the cylindrical tower-type vessel is first packed with packing materials, such as broken stone, or gravel, and then sludge is caused to adhere onto the surface of said packing material to thereby form a sludge layer. Subsequently, organic waste water containing nitrate ions or nitrite ions is flowed upwardly from the bottom of said vessel by means of a pump or a head tank. Thereby said waste water is brought into contact with the denitrifying sludge adhered to the packing material packed within the tower-type vessel and causes said nitrate ions and nitrite ions to gasify. Organic compounds within said waste water are simultaneously decomposed, while newly formed sludge is caught by the packing material and the denitrifying sludge adheres to the packing material. The treated water flowing out from the upper part of the vessel does not contain any denitrifying sludge and can be discharged as it is. Furthermore, in order to discharge any excessive sludge adhered to packing material, an outlet may be provided at the middle or the bottom of the vessel so as to let excessive sludge to be automatically discharged by virtue of water pressure whenever feeding of waste water is suspended and said outlet is opened.

As an alternative to the foregoing, the so-called sludge blanket-type treating process can be used. According to this process the cylindrical vessel is packed with sludge, as it is in lieu of the aforesaid packing material, so as to make it form a layer. The resultant sludge layer is stable because the denitrifying sludge is relatively heavy. Waste water containing nitrate ions or nitrite ions is fed from the bottom of the vessel by means of a pump or a headtank to thereby bring said water into contact with the sludge and cause nitrate ions or nitrite ions contained therein to be reduced to $N_2$ gas. In this case upward flow of waste water at a fixed speed will bring about the formation of a sludge layer within the vessel on account of the large specific gravity of denitrifying sludge. Inasmuch as an enormous change in the speed of waste water flow may put the sludge layer into disorder, it is necessary to maintain an appropriate speed thereof.

In general, activated sludge whose main constituent is denitrifying sludge is relatively heavy, so that when waste water is caused to flow upwardly, sludge suspended within said water is prone to adhere to the packing material and, as a result, a stable layer of sludge may be formed. On the contrary, when waste water is caused to flow downwardly, sludge is apt to come off from the packing material and it is hard to obtain a stable layer of sludge, and, therefore, this process is undesirable. In the case of the sludge blanket-type treating process, too, downward flow of waste water may cause the sludge to settle in a high density layer in the lower part of the vessel and make it necessary to apply a high water pressure to expedite the flow of waste water. Therefore, downward flow of the waste water is unsuitable.

When a packing material is employed, even if the specific gravity of the denitrifying sludge is relatively small, the sludge layer can be kept in a stable condition as a result of the adhesion of sludge onto the packing material, and the sludge will not be washed away even when the speed of the waste water flowing into the vessel is increased, whereby the quality of treated water is ensured to be uniform. When packing material is not employed, the effective area in which the denitrifying sludge and waste water come into contact with each other increases to an extent corresponding to the volume of packing material when it is employed, so that the vessel as a whole can be effectively utilized and the efficiency of waste water treatment be enhanced that much.

According to the present invention, nitrate or nitrite ions contained in the waste water cause denitrifying bacteria within the activated sludge to effect nitrate-respiration, whereby organic matters within said waste water are decomposed and finally removed as $N_2$ gas, NO gas, and the like. In other words, nitrous or nitric nitrogen contained in the waste water is gasified and removed to thereby make said waste water harmless and at the same time remove organic matters from said water.

In addition, according to the present invention, the waste water treatment can be performed without aeration within a tank or vessel, so that it can be put into practice without regard to such restriction as the location of the settling tank. Because it is a very simple process with no requirement for any special apparatus, it is extremely economical.

The present invention will be described in further detail in connection with preferred embodiments.

EXAMPLE 1

Raw waste water comprising 7,100 p.p.m. of $B.O.D._5$ separated from solid matters was fed to a reaction tank as shown in FIG. 1, and by adding thereto sodium nitrate solution and activated sludge produced by sewage treatment, acclimation of denitrifying sludge was conducted. Treatment was conducted by successively feeding said raw sewage and sodium nitrate solution. After treatment by employing a method comprising a retention period of 24 hours, added quantity of sodium nitrate 13,000 p.p.m., M L S S, 3,7000 p.p.m., and $B.O.D._5$ loading 3.6 22day, the B.O.D. of treated water became 520 p.p.m. Most of B.O.D. of said treated water consisted of suspended solid, and could be separated by a centrifugal separation process, and the residual B.O.D. was 50 p.p.m. Furthermore, when treatment was conducted by employing 20,000 p.p.m. of sodium nitrite in lieu of sodium nitrate without changing other conditions, the resultant B.O.D. was 530 p.p.m.

EXAMPLE 2

Figure 2:
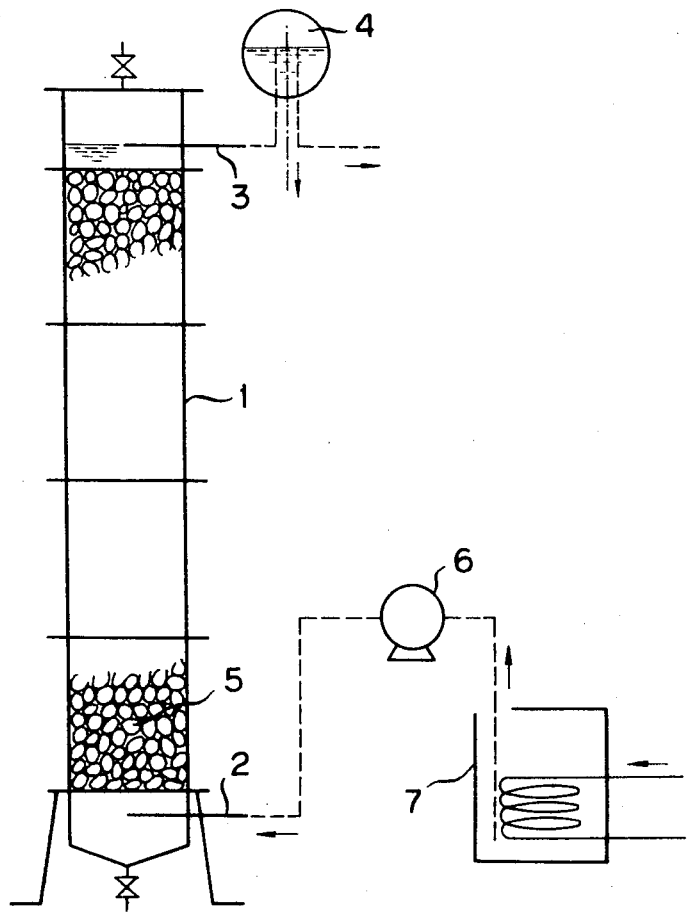
FIG. 2 shows a cross-sectional view of another embodiment of the present invention.

In this case, treatment was conducted by employing such an apparatus as shown in FIG. 2 and employing packing material.

2 the drawing, 1 denotes the tower, 2 denotes the inlet for waste water, 3 denotes the outlet for treated water, 4 denotes the gas separation device, 5 denotes the packing material packed inside the tower, and 6 denotes the pump for use in feeding waste water, respectively. The treatment apparatus consisted of a cylindrical tower of 15 cm. in diameter and 170 cm. high which was packed with 3-7 cm. broken stones from the bottom up to the top and had an effective capacity of 19.5.1. (with space rate 61.7 percent).

As for the waste water to be treated, a solution was prepared by dissolving 1 g. of skim milk available in the market into 1 l. of tapwater and adding to the resultant mixture 2 g. of sodium nitrate.

At the beginning, activated sludge (returned sludge produced in the disposal plant as a result of the activated sludge process for the treatment of supernatant liquor effluent from anaerobic digester treating night-soil) was fed to the tower 1 from its upper part by means of a pump (not shown in the drawing) thereby causing sludge to adhere to the surface of packing material 5, and subsequently waste water was continuously fed into the tower from pipe 2 through the heat exhanger 7 by employing the pump 6 at the rate of 57 liters per day. Sodium nitrate contained in waste water was utilized as a source of oxygen for denitrifying bacteria, and the thus utilized sodium nitrate was reduced to gas and flowed upwardly through the gaps of packing material together with waste water to go into the gas liquor separation tank 4 through pipe 3 to be separated into gas and treated water.

In this case, C.O.D. of waste water employed averaged 1,200 p.p.m., and that of sodium nitrate averaged 1,5000 p.p.m. The result was analyzed as shown in table 1, to wit, C.O.D. of treated water and nitrate nitrogen was 210 p.p.m. and 40 p.p.m., respectively, and the rate of C.O.D. removal was about 83 percent.

The treated water thus obtained contained 75 p.p.m. of suspended solids and was comparatively clear.

TABLE 1

| Item of analysis | pH | C.O.D., p.p.m. | S.S., p.p.m. | $NO_3$-N, p.p.m. | B.O.D., p.p.m |
|---|---|---|---|---|---|
| Waste water | 7.2 | 1,200 | 0 | 250 | 1,020 |
| Treated water | 7.9 | 210 | 75 | 40 | 100 |

EXAMPLE 3

In this case, the treatment was conducted according to the sludge blanket type process. The same tower as in example 2 was employed, but, instead of packing material, 13 l. of activated sludge was packed intact within the tower. The quality of waste water and the quantity employed were the same as in example 2. Feeding of waste water by upward flow caused the sludge to swell about 20 percent of its volume in the stationary state, but the resultant sludge blanket was stable. Gas generated by reduction of nitrate ions ascended linearly infiltrating the sludge to escape away from the sludge blanket. The upper half of the tower was so devised as to permit suspended solids to make a natural precipitation, therein after coming up through sludge blanket, but throughout the treatment period in this example there was observed no such sizable sludge as to make a natural settling therein.

Analytical result of the treatment was as shown in the following table 2.

It is to be noted that C.O.D. of the result treated water was 96.4 p.p.m. and B.O.D. was 17.0 p.p.m., and accordingly, the water was clear. Suspended solids (S.S.) was 60.0±8.3 p.p.m. and showed a stable value.

TABLE 2

| Item of analysis | pH | C.O.D., p.p.m. | S.S., p.p.m. | $NO_3$-N, p.p.m. | B.O.D., p.p.m |
|---|---|---|---|---|---|
| Waste water | 7.2 | 1,200 | 0 | 250 | 1,020 |
| Treated water | 7.9 | 96.4 | 60 | 14 | 17.0 |

What we claim is:

1. An anaerobic process of treating organic waste water which comprises bringing activated sludge consisting mainly of denitrifying bacteria into contact with raw organic waste water, adding by mixing at least one member selected from the group consisting of nitrate ions and nitrite ions, keeping said mixed waste water and added ions in an anaerobic state throughout the process to thereby reduce the nitrate or nitrite and utilize the resultant chemical oxygen to decompose organic matters contained in said organic waste water.

2. A method according to claim 1, wherein organic waste water is mixed with said ions and is then brought into contact with said activated sludge.

3. A method according to claim 1, wherein organic waste water is mixed with waste water containing said ions and then is brought into contact with said activated sludge.

4. A method according to claim 1, wherein organic waste water originally containing said ions is brought into contact with activated sludge.

5. A method according to claim 1, wherein the pH of said waste water and added ions is maintained in the range of about 7-9 to thereby treat organic waste water.

6. A method as defined in claim 1 wherein the contact between said activated sludge and said organic waste water is effected by mixing organic waste water with activated sludge in a tank.

7. A method as defined in claim 1 wherein the contact between said activated sludge and said organic waste water is effected by causing organic waste water to pass upwardly through activated sludge layer formed within a vessel.

8. A method according to claim 7, wherein said activated sludge layer consists of packing material whose surface is covered with activated sludge adhered thereto.

9. A method according to claim 7, wherein said activated sludge layer consists of a sludge blanket.

10. A method according to claim 1, wherein the quantity of nitrate or nitrite ions mixed in the waste water is in excess of about 0.5 kg. in terms of oxygen per 1 kg. of B.O.D. of the waste water treated.